UNITED STATES PATENT OFFICE.

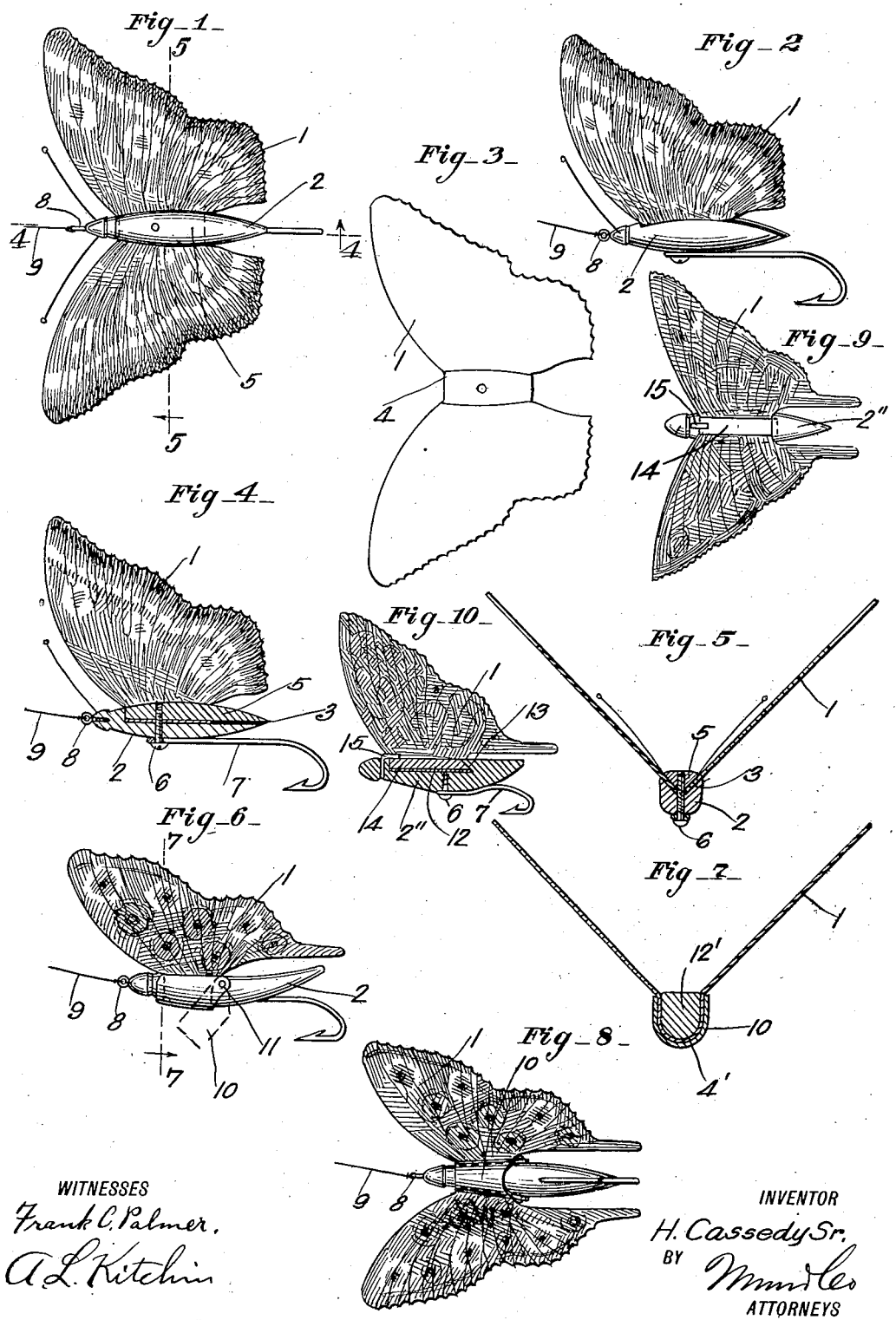

HIRAM CASSEDY, SR., OF BROOKHAVEN, MISSISSIPPI.

FISHERMAN'S FLY.

1,309,061.   Specification of Letters Patent.   Patented July 8, 1919.

Application filed March 12, 1918. Serial No. 221,967.

*To all whom it may concern:*

Be it known that I, HIRAM CASSEDY, Sr., a citizen of the United States, and a resident of Brookhaven, in the county of Lincoln and State of Mississippi, have invented a new and Improved Fisherman's Fly, of which the following is a full, clear, and exact description.

This invention relates to fishermen's flies, and has for an object the provision of an improved construction which will imitate a natural fly in appearance and also in action when in the water.

Another object of the invention is to provide a fly having a body which may be adjusted to accommodate removable wings.

A still further object of the invention, more specifically, is the provision of a fly having a body arranged with a clamping section for clamping wings to the body in a natural position while allowing a quick removal therefrom at any time.

In the accompanying drawing:

Figure 1 is a top plan view of a fly disclosing an embodiment of the invention.

Fig. 2 is an edge view of the fly shown in Fig. 1.

Fig. 3 is a top plan view of a blank of a set of wings.

Fig. 4 is a longitudinal vertical section through Fig. 1 on line 4—4.

Fig. 5 is a transverse sectional view through Fig. 1 on line 5—5.

Fig. 6 is a side view of a slightly modified form of the invention to that shown in Fig. 1.

Fig. 7 is a sectional view through Fig. 6 on line 7—7.

Fig. 8 is a top plan view of the structure shown in Fig. 6.

Fig. 9 is a top plan view of a further modified form of fly or lure to that shown in Figs. 1 and 6.

Fig. 10 is a section through Fig. 9 on line 10—10.

Referring to the accompanying drawing by numerals 1 indicates the wings of a butterfly and 2 the body. The wings 1 are made from cloth, paper, or parchment, or in fact any desired material, but preferably some material which will withstand the action of water to a certain extent and which will lithograph so as to receive the proper colors of the different flies desired. The body 2 is formed with a notch 3 in which the central section 4 of the wings 1 is positioned, said central section being clamped rigidly in place by a filling clamping block 5 held in place in any suitable way, as for instance by screw 6. Preferably the screw 6 also passes through the eye of the hook 7 so that the hook is clamped in a correct position. A screw eye 8 is connected to the head or front of the body 2, said screw eye receiving the end of the line 9 whereby the lure may be properly cast. In angling for game fish it is known that extreme care must be used at all times, and in addition only certain kinds of insects must be provided at different times of the year and even at different times of the day. In order to answer these requirements it is customary for fishermen to take along a supply of flies, to in a certain sense comply with the tastes of the fish. In the present invention it is aimed to form the shape of the body 2 according to some particular insect and to provide a number of different wings of that insect as well as wings of other insects which may be applied to the body at any time. In this way only a small supply of bodies is necessary while a comparatively large supply of wings may be utilized to satisfy the different fish sought.

As shown in Fig. 5 the cutaway portion or socket 3 is preferably V-shaped and the block 5 made to correspond so that the wings 1 will set at a substantially proper angle for insects of the kind desired. As the body 2 with the clamp 5 and associate parts weighs more than the wings the body will usually strike the water first and then the device will fall over to one side so that one of the wings will become wet while the other waves more or less in the air, thus imitating more or less the action of a butterfly or other insect when they accidentally fall into the water. In order to keep up the illusion of a live butterfly or insect the fisherman can give a slight movement to the device by proper manipulation of the string 9.

In Figs. 6 and 8 a modified form of the invention is shown in which removable wings are held in place by a pivotally mounted member 10, said member being pivotally supported by suitable means, as for instance pins 11 so that it may be lowered to the position shown in dotted lines in Fig. 6, while the wings are fitted in position as shown in Fig. 7, after which the clamping member 10 is forced back into position and held therein by friction. The central section 4' must, of course, be sufficiently wide to be wrapped around the body 2' as shown in Fig. 7 in order that the wings 1 may be properly positioned above the body.

In Figs. 9 and 10 will be seen a further modified form of the invention in which the body 2'' is provided with a cutaway portion 12 having an overhanging shoulder 13 for receiving the clamping block 14. The block 14 is held in position by the overhanging shoulder 13 and by the pivotally mounted catch 15 secured to the body 2''. When it is desired to remove the wings 1 from this form of the invention catch 15 is moved to one side, as for instance to a position at right angles to that shown in Fig. 9 and then the clamping block 14 moved upwardly pivotally after which the wings are removed and new wings applied, after which block 15 is replaced and again moved over the end of the block.

It is, of course, understood that the body in all the different forms of the invention may be made of any desired shape, and that the wings also may be any desired shape and color to match the body and to provide an insect of the proper appearance for the fish at the particular season or time of the day.

In forming the body 2 of the preferred or any of the modified forms of the invention it will be understood that the same may be made from wood, hollow metal or any desired material which will accomplish the results desired.

What I claim is:

1. A fish lure comprising a body having a notch therein, a wing structure formed with a section adapted to fit into said notch, a clamping block arranged in said notch so as to clamp said wings to said body, and means for locking said wings between said body and block.

2. A fish lure comprising a body formed with a notch having faces at an angle to each other, a wing structure having a central section fitting into said notch, a clamping block having a lower surface conforming to the shape of said notch and fitting therein for clamping said central section of the wing structure to the body, and a clamping screw for clamping a hook to said body and at the same time locking said clamp in said notch.

3. A fish lure comprising a body formed with a notch in the upper part, a wing structure having a section adapted to fit in said notch, a clamping block fitting in said notch, and a clamping member engaging said block and said body for locking the block in said notch, said clamping member being carried by said body.

HIRAM CASSEDY, Sr.